United States Patent [19]

Lebowitz

[11] 4,193,697
[45] Mar. 18, 1980

[54] EGG BEATER

[75] Inventor: Sam Lebowitz, New York, N.Y.

[73] Assignee: Copco, Inc., New York, N.Y.

[21] Appl. No.: 952,459

[22] Filed: Oct. 18, 1978

[51] Int. Cl.² ............................................. A47J 43/10
[52] U.S. Cl. ..................................................... 366/129
[58] Field of Search .................... 366/129; 416/76, 77; 145/61 EA, 61 L, 61 C, 66–74

[56] References Cited
U.S. PATENT DOCUMENTS

| | | | |
|---|---|---|---|
| 2,565,723 | 8/1951 | Euler et al. | 366/129 X |
| 3,133,976 | 5/1964 | Gross | 366/129 X |

*Primary Examiner*—Philip R. Coe

*Attorney, Agent, or Firm*—Michael Ebert

[57] ABSTRACT

An egg beater having a manually-cranked drive wheel with opposed gear faces which are engaged by a pair of pinions keyed to the shafts of intermeshing beater elements whereby the turning wheel causes these elements to rotate in opposite directions. The drive wheel and pinions are encased in a doughnut-shaped housing having a scalloped periphery, the housing being dimensioned to fit into the palm of one hand of the operator to be gripped by the fingers thereof, so that it also functions as the beater handle. The wheel is turned by a crank arm whose knob is grasped by the other hand of the operator.

2 Claims, 3 Drawing Figures

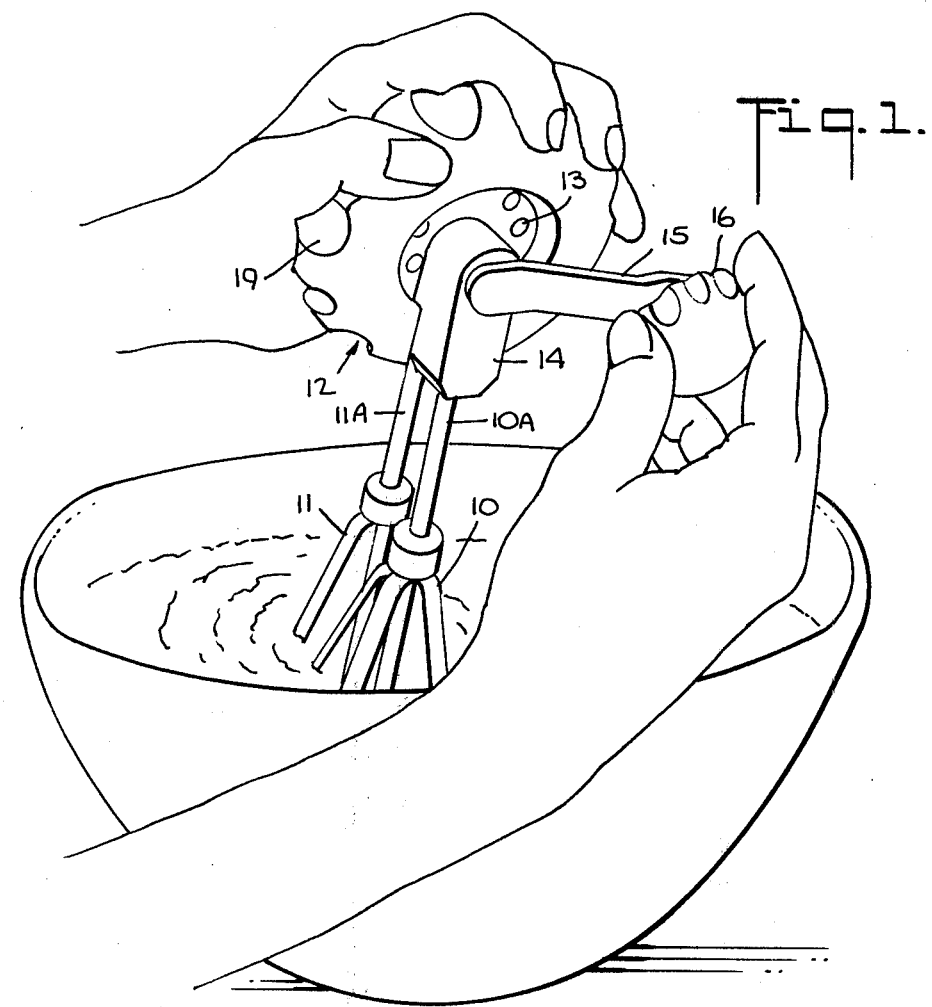
Fig.1.
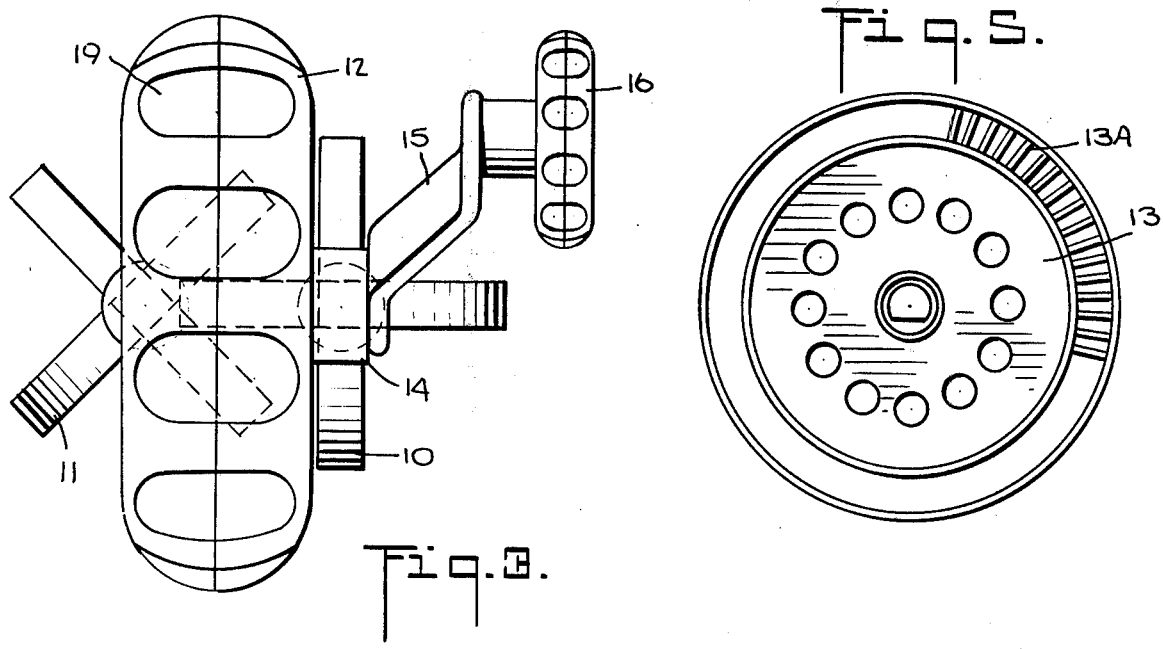
Fig.2.
Fig.3.

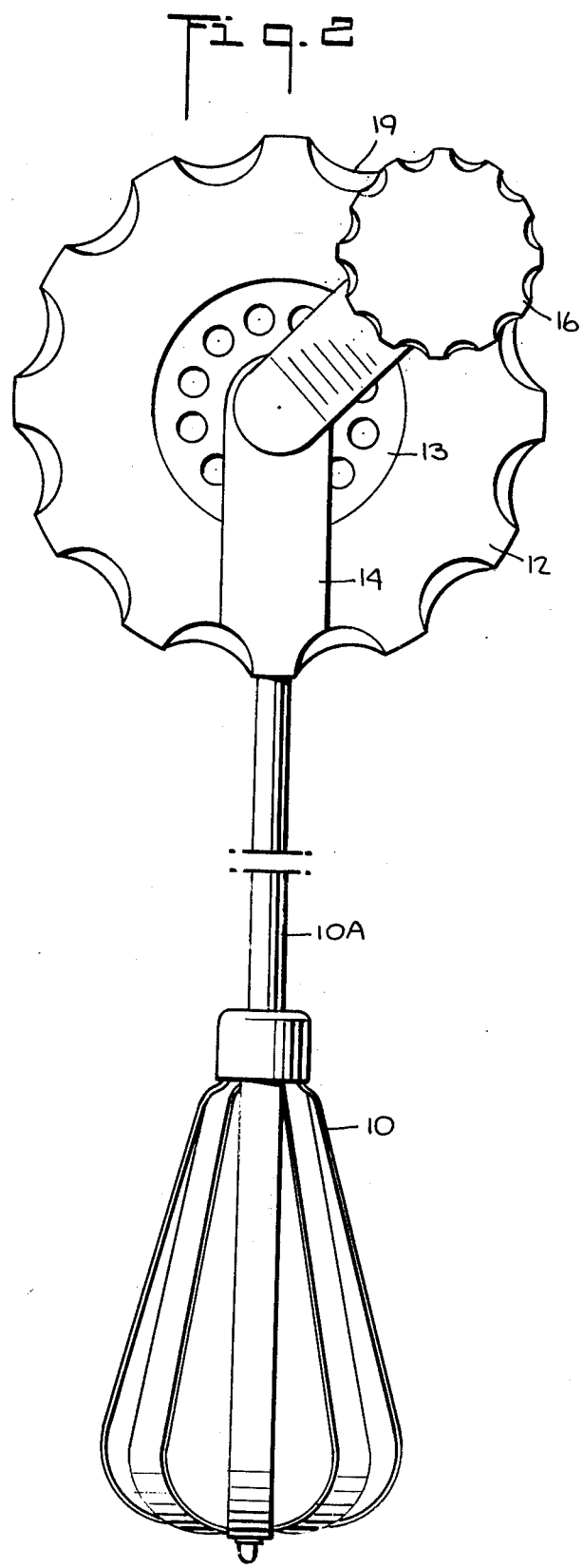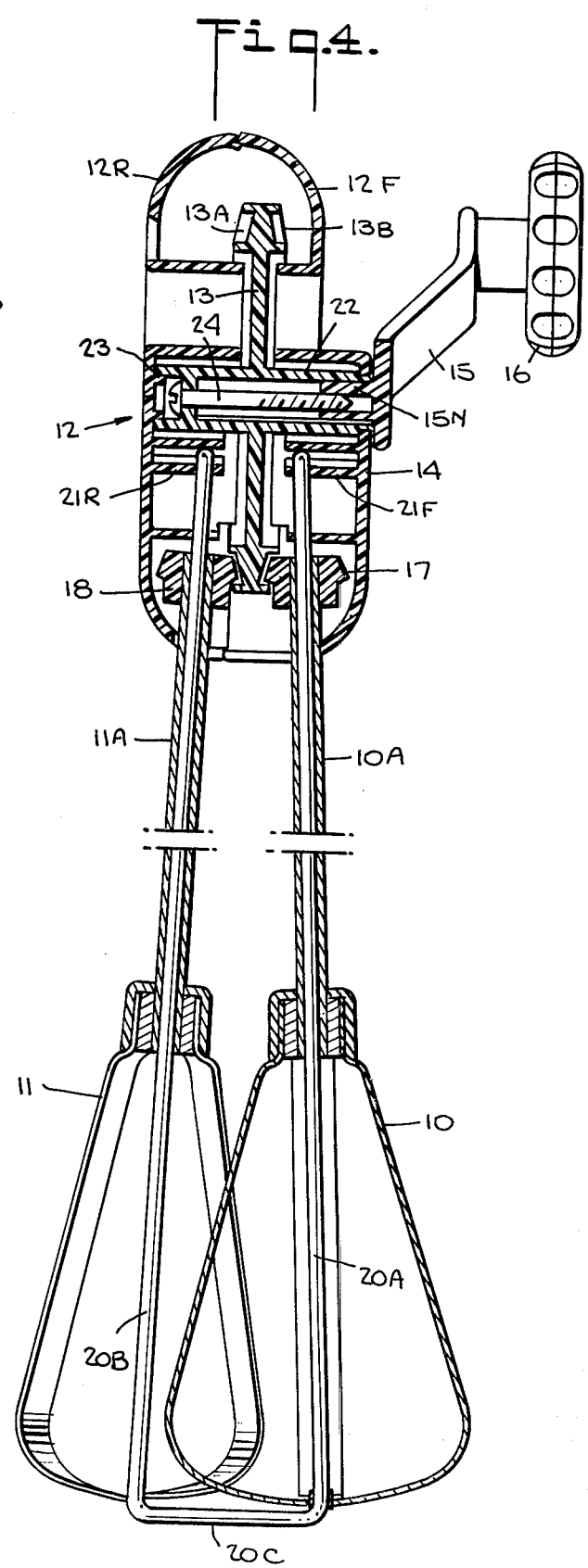

EGG BEATER

BACKGROUND OF INVENTION

This invention relates generally to egg beaters, and in particular to a beater whose drive wheel and the pinion gears driven thereby for rotating the beater elements are encased in a doughnut-shaped housing which is dimensioned to also function as the handle of the beater.

An egg beater is a hand-operated kitchen utensil adapted to beat, stir or whip ingredients in a fluidized state to bring about a change in the viscosity or other physical characteristic of the batter being worked on. The standard household egg beater is constituted by a manually-cranked drive wheel having opposed gear faces which are engaged by pinions keyed to the shafts of a pair of beater elements, the wheel being supported within an open frame. A handle is either mounted directly above the frame or is attached to the frame at an angle thereto.

In operating a conventional beater of this type, the operator grasps the handle in one hand and uses his other hand to turn the crank, the beater being positioned so that the shafts are upright and the beater elements are immersed in the mix to be processed. When, for example, the ingredients being beaten are constituted by flour, liquid and other materials forming a batter, continued beating of this mixture acts to thicken and render it more viscous. As a result, the batter becomes increasingly resistant to the beating action.

This increase in resistance to beating is communicated to the axle of the drive wheel to which the crank arm is coupled, thereby generating a torque seeking to swing the beater about the drive wheel axle to displace the beater from its proper upright position. Since the handle is offset with respect to the drive wheel axle, the beam between the handle and the axle constituting, as it were, a lever arm which transmits the torque to the operator's hand. This makes it difficult for the operator to maintain the beater in a steady position, and the operator often finds himself struggling with the beater to keep it in operation.

SUMMARY OF INVENTION

In view of the foregoing, the main object of this invention is to provide an egg beater in which the drive wheel and the pinions in engagement therewith are encased in a graspable housing which also serves as the beater handle, thereby dispensing with the usual handle and reducing the overall size of the beater.

More particularly, it is an object of this invention to provide a beater whose housing has a doughnut shape with a scalloped periphery defining finger depressions which acts as a handle to facilitate handling, whereby the axis of the drive wheel encased in the housing passes through the center of the operator's palm, giving the operator a much firmer control of the egg beater so that its operating position may be held steady even when heavy resistance to beating is encountered.

Also an object of the invention is to provide a beater of simple and efficient mechanical design having an inherently attractive appearance, which beater lends itself to mass-production at low cost.

Briefly stated, these objects are attained in an egg beater in accordance with the invention having a drive wheel provided with opposed gear faces which are engaged by pinions keyed to the hollow shafts of a pair of beater elements which are supported in intermeshing relation by a yoke having a cross-piece bridging a pair of rods passing through the hollow shafts and anchored in a doughnut-shaped housing which encases the drive wheel and the pinions.

The housing is formed of complementary front and rear half sections, and the wheel is supported on an axle lying on an axis extending transversely through the center of the housing, one end of the axle being journalled in a bearing on the rear half section, the other end of the axle passing through a journal box integral with the front half section and being attached to a crank arm having a knob at the free end thereof.

The doughnut-shaped housing has a scalloped periphery to provide finger depressions and it is dimensoned so that it can be cupped in the palm of one hand of an operator with the fingers thereof placed in the finger depressions, the other hand engaging the knob of the crank arm to turn the drive wheel. Since the transverse axis of the housing passes the operator's palm, the operator is able, without difficulty, to overcome torque forces seeking to swing the beater about the axis and to hold the beater steady even when high beating resistance is encountered.

OUTLINE OF DRAWINGS

For a better understanding of the invention as well as other objects and further features thereof, reference is made to the following detailed description to be read in conjunction with the accompanying drawings, wherein:

FIG. 1 is a perspective view of an egg beater in accordance with the invention as seen held in the hands of an operator;

FIG. 2 is a front elevational view of the beater;

FIG. 3 is a plan view of the beater;

FIG. 4 is a longitudinal section taken through the beater; and

FIG. 5 is a separate elevational view of the drive wheel the beater.

DESCRIPTION OF INVENTION

Referring now to FIG. 1, there is shown an egg beater in accordance with the invention which includes a pair of intermeshing beater elements 10 and 11 of conventional blade cage design supported for rotation on hollow shafts 10A and 10B. The shafts extend into a housing, generally designated by reference numeral 12, within which is disposed a drive wheel 13 whose axle is supported at one end within a journal box 14 integral with the housing, the axle being connected to a crank arm 15 having a circular knob 16 attached to the free end thereof.

Drive wheel 13 is provided at its periphery with opposed gear faces 13A and 13B which are engaged by a pair of pinions 17 and 18 keyed to shafts 10A and 10B so that when drive wheel 13 is cranked by the operator, beater elements 10 and 11 are caused to rotate in opposite directions.

Housing 12 has a doughnut-like shape and is composed of complementary front and rear half sections 12F and 12R, journal box 14 being integral with the front section. The housing is preferably molded of high-strength synthetic plastic material such as ABS, polypropylene, or polycarbonate and its periphery is scalloped to define finger depressions 19.

The beater elements are supported by means of a yoke having a cross-rod section 20C which bridges the beater elements and a pair of straight rod sections 20A and 20B which extend through hollow shafts 10A and 10B, respectively, and are anchored in hollow posts 21R and 21F in the rear and front sections of the housing.

Drive wheel 13 is mounted on a hollow axle 22, the rear end of which is journalled on a bearing 23 integral with the inner wall of rear housing section 12R, the front end of the axle being supported within a bearing formed in journal box 14. The neck 15N of crank arm 15 is telescoped within the front end of axle 22 and is secured thereto by a screw 24 coaxially disposed within the hollow axle.

Thus it will be seen that the operating components of the egg beater, including drive wheel 13 and pinions 17 and 18 in engagement therewith, are encased within the doughnut-shaped housing 12 and are protected thereby. There is no separate handle as in conventional beaters, for the housing is shaped and dimensioned to be cupped within the palm of one hand of the operator, as shown in FIG. 1, with the fingers of this hand seated within finger depressions 19, the other hand holding knob 16 on the crank arm.

It will be also seen that the configuration of knob 16 is a reduced scale version of housing 12 and also includes a scalloped periphery, so that these elements of the beater are physically and aesthetically harmonious.

The beater, unlike conventional beaters, does not have a purely functional appearance dictated by its exposed drive wheel and pinions, for these components are protectively concealed by the housing which also functions as the handle of the beater. This housing therefore imparts a compactness to the beater and an avoidance of the unsightly protuberances which characterize the usual egg beater.

Moreover, because the operator's hand is wrapped about the housing which functions as the handle, the size of this hand is immaterial so that the beater may be grasped without difficulty by a broad range of hand sizes. It will also be appreciated that a beater in accordance with the invention is adapted for use by the right or left hand.

Moreover, the advantages of the invention are by no means limited to its more compact and efficient design, for the axle 22 of the drive wheel lies on a transverse axis passing through the center of the housing and through the center of the palm of the operator's hand which grips the housing. Hence those torque forces which result from resistance to beater rotation produced by the batter being worked on and which tend to swing the beater about this transverse axis can easily be overcome by the operator, who has no difficulty in holding the beater steady even under heavy resistance conditions.

While there has been shown and described a preferred embodiment of an egg beater in accordance with the invention, it will be appreciated that many changes and modifications may be made therein without, however, departing from the essential spirit thereof.

I claim:

1. An egg beater comprising:
   A. a manually-cranked drive wheel mounted on an axle and having opposed gear faces;
   B. a pair of pinions engaging the gear faces and keyed to hollow shafts supporting intermeshing beater elements, whereby turning of the wheel results in rotation of the elements in opposite directions;
   C. a doughnut-shaped housing formed of complementary front and rear half sections encasing said wheel and said pinions and provided with bearings for said wheel axle to support said axle on an axis extending transversely through the center of the housing, said rear half having a bearing into which one end of the axle is journaled, the other end of the axle passing through a journal box projecting laterally from and integral with the front half section and being connected to a crank arm having a knob at its free end, said housing being shaped and dimensioned to be received in the palm of one hand of an operator and having a scalloped periphery to define finger depressions for said hand to function as the beater handle, the rear section of the housing being cupped in the palm, the other hand engaging said knob and cranking said wheel, said axis passing through said palm whereby the beater may be held steady to resist forces seeking to displace it; and
   D. a yoke for supporting said beater elements and provided with rods which extend through said hollow shafts and are anchored in said housing.

2. An egg beater as set forth in claim 1, wherein said knob is a reduced scale version of said scalloped housing.

* * * * *